(12) United States Patent
Matsumoto (10) Patent No.: US 10,310,312 B2
(45) Date of Patent: Jun. 4, 2019

(54) DISPLAY APPARATUS (71) Applicant: Sakai Display Products Corporation, Sakai-shi, Osaka (JP)

(72) Inventor: Kouji Matsumoto, Sakai (JP)

(73) Assignee: SAKAI DISPLAY PRODUCTS CORPORATION, Osaka (JP)

(*) Notice: Subject to any disclaimer, the term of this patent is extended or adjusted under 35 U.S.C. 154(b) by 0 days.

(21) Appl. No.: 15/817,816

(22) Filed: Nov. 20, 2017

(65) Prior Publication Data

US 2018/0074363 A1 Mar. 15, 2018

Related U.S. Application Data

(63) Continuation of application No. PCT/JP2015/065101, filed on May 26, 2015.

(51) Int. Cl.
G02F 1/13 (2006.01)
G02F 1/1333 (2006.01)
(Continued)

(52) U.S. Cl.
CPC .... G02F 1/133308 (2013.01); G02F 1/13452 (2013.01); *G02F 1/13306* (2013.01); *G02F 2001/13332* (2013.01); *G02F 2001/133314* (2013.01); *G02F 2001/133317* (2013.01); *G02F 2201/50* (2013.01)

(58) Field of Classification Search
CPC ... G02F 1/133308; G02F 2001/133317; G02F 1/13452; G02F 1/1336; G02F 1/13306; G02F 2001/133314; G02F 2001/13332; G02F 2201/50
See application file for complete search history.

(56) References Cited

U.S. PATENT DOCUMENTS

2001/0002145 A1* 5/2001 Lee .................. G02F 1/133308
349/58
2013/0155653 A1* 6/2013 Kim .................... H05K 1/0203
362/97.1
(Continued)

FOREIGN PATENT DOCUMENTS

JP 2001-201733 A 7/2001
JP 2003-167230 A 6/2003
(Continued)

OTHER PUBLICATIONS

English Translation JP2001-201733.*
(Continued)

*Primary Examiner* — Steven T Sawyer
(74) *Attorney, Agent, or Firm* — Keating & Bennett, LLP (57) ABSTRACT

An object is to provide a display apparatus capable of suppressing damage to flexible printed boards. Each flexible printed board (31) is bent so as to be farther from a bezel (21) and thereby protected totally in a peripheral edge direction of a display panel (11). Therefore, contact between the flexible printed board (31) and the bezel (21) can be suppressed. This makes it possible to suppress displacement or twist or the like of the flexible printed board (31) due to contact with the bezel (21). Thus, damage to the flexible printed board (31) attributable to contact between the flexible printed board (31) and the bezel (21) can be suppressed.

6 Claims, 5 Drawing Sheets

(51) Int. Cl.
*G02F 1/1345* (2006.01)
*G02F 1/133* (2006.01)

(56) References Cited

U.S. PATENT DOCUMENTS

| 2016/0147098 A1 | 5/2016 | Isami |
| 2016/0183387 A1* | 6/2016 | Tsunekawa .......... H05K 5/0017 361/749 |

FOREIGN PATENT DOCUMENTS

| JP | 2006-030861 A | 2/2006 |
| JP | 2016-099463 A | 5/2016 |

OTHER PUBLICATIONS

Hideki et al., Display Device, and method for manufacturing the same, 2003 (JP2003-167230) (Year: 2003).*
Official Communication issued in International Patent Application No. PCT/JP2015/065101, dated Aug. 18, 2015.

* cited by examiner

DISPLAY APPARATUS

CROSS REFERENCE TO RELATED APPLICATIONS

This is a continuation of International Application No. PCT/JP2015/065101, with an international filing date of May 26, 2015, the entire contents of which are hereby incorporated by reference.

BACKGROUND OF THE INVENTION

1. Field of the Invention

The present invention relates to a display apparatus in which a flexible printed board is protruded from a display panel.

2. Description of the Related Art

An LCD (Liquid Crystal Display) device includes an LCD panel with flexible printed boards mounted thereon, as well as a bezel and a P-chassis both being rectangular frame members. A peripheral edge portion of the LCD panel is interposed between the bezel and the P-chassis (see Japanese Laid-Open Patent Publication No. 2006-30861 (JP 2006-30861 A)).

The bezel is removably attached to the P-chassis on which the LCD panel is provided. Due to this, the bezel, during its fitting and removal, may contact the flexible printed board mounted on the LCD panel, so that the bezel may incur displacement or twist or the like, causing the flexible printed board to be damaged.

In the LCD device described in JP 2006-30861 A, the peripheral edge portion of the flexible printed board ('printed circuit board' in the literature) is engaged with a protrusion provided in the P-chassis ('resin frame' in the literature) so as to suppress any displacement or twist or the like of the flexible printed board.

Also in the LCD device described in JP 2006-30861 A, the peripheral edge portion of the flexible printed board is covered with a small piece of rubber attached to the P-chassis so as to suppress contact of the flexible printed board with the bezel.

SUMMARY OF INVENTION

However, the protrusion provided in the LCD device described in JP 2006-30861 A is not intended to suppress the contact between the flexible printed board and the bezel. Therefore, it is difficult to suppress, by means of the protrusion, any damage to the flexible printed board due to the contact between the flexible printed board and the bezel.

Also, the small piece of rubber provided in the LCD device described in JP 2006-30861 A is intended to suppress the contact between the peripheral edge portion of the flexible printed board and the bezel. Therefore, it is difficult to suppress, by means of the small piece of rubber, any damage to the flexible printed board die to the contact between central portion of the flexible printed board and the bezel.

The present invention having been accomplished in view of the above-described circumstances, a primary object of the invention is, therefore, to provide a display apparatus enabled to suppress damage to the flexible printed board.

In one aspect of the present invention, there is provided a display apparatus comprising:

a display panel;
a front frame body which supports a peripheral edge portion of the display panel from front of the display panel;
a back frame body which supports the peripheral edge portion of the display panel from back of the display panel;
a flexible printed board protruded from the peripheral edge portion of the display panel and bent toward the back frame body at a bent portion of the flexible printed board; and
a protective member attached to the back frame body, wherein
the protective member includes:
a sheet-like portion interposed between the front frame body and the flexible printed board; and
two protruding portions attached to the back frame body side by side along a peripheral edge direction of the display panel and protruded from one surface of the sheet-like portion, and
the flexible printed board is placed between the two protruding portions.

In the display apparatus of one embodiment,
the sheet-like portion is more flexible than the two protruding portions, and
a protruding length of each of the two protruding portions is larger than a thickness of the sheet-like portion.

In the display apparatus of one embodiment,
the two protruding portions are bonded to the back frame body, and
a bonding region of each of the two protruding portions to the back frame body has an area of at least 4 mm×3 mm.

In the display apparatus of one embodiment,
a fit-in portion into which each of the two protruding portions is to be fitted is provided in the back frame body.

In the display apparatus of one embodiment,
the sheet-like portion of the protective member is interposed between the front frame body and, a portion between the bent portion and a distal end of the flexible printed board.

In the display apparatus of one embodiment,
an electronic component is mounted on a surface of the flexible printed board facing the back frame body, and
the electronic component and the back frame body are separate from each other.

According to one aspect of the invention, the flexible printed board is bent toward the back frame body (i.e., bent so as to be farther from the front frame body), and the protective member is interposed between the front frame body and the flexible printed board.

Accordingly, there is no possibility that the flexible printed board may unnecessarily approach the front frame body. Thus, the flexible printed board is protected from damage due to contact with the front frame body.

As viewed from the front frame body, the flexible printed board is covered with the protective member over a range from one side to the other side in the peripheral edge direction of the display panel (hereinafter, referred to simply as peripheral edge direction). Therefore, not only both end portions of the flexible printed board in the peripheral edge direction but also central portion in the peripheral edge direction is prevented from contact with the front frame body.

According to one aspect of the invention, the protective member is simple in configuration so as to include the sheet-like portion and the two protruding portions. Therefore, the protective member is simple to manufacture.

According to one aspect of the invention, since the flexible printed board is surrounded by the back frame body, the sheet-like portion and the two protruding portions, unnecessary approach and contact of the flexible printed board with the front frame body is further suppressed.

For example, when external force is applied to the display device so that the flexible printed board is vibrated, the flexible printed board and the sheet-like portion may contact each other. However, in one aspect of the present invention, the sheet-like portion is flexible so as to be easily deformed upon contact with the flexible printed board. Accordingly, there is no possibility that unnecessary external force is applied from the sheet-like portion to the flexible printed board upon contact with each other.

Meanwhile, the two protruding portions are rigid so as to securely support the sheet-like portion, therefore suppressing excessive deformation of the sheet-like portion.

As a result of the above features, there is no possibility that the flexible printed board is damaged due to contact of the flexible printed board with the sheet-like portion or to excessive displacement or twist or the like of the flexible printed board caused by excessive deformation of the sheet-like portion.

According to one embodiment, each of the two protruding portions has a bonding region having a minimum or more area required for bonding to the back frame body. Therefore, unnecessary separation of the two protruding portions from the back frame body (resultantly, drop-off of the protective members from the back frame body) is suppressed.

According to one embodiment, the two protruding portions are fitted into the fit-in portions provided in the back frame body. Therefore, positioning of the two protruding portions into their fixing positions in the back frame body is easily achievable. Still more, unnecessary separation of the two protruding portions from the back frame body (resultantly, drop-off of the protective members from the back frame body) is suppressed by frictional force between the inner surfaces of the fit-in portions and the outer surfaces of the two protruding portions.

According to one embodiment, the flexible printed board has a portion bent toward the back, frame body. Neighborhood of the bent portion in the flexible printed board is higher in elastic restoring force (so-called 'flexible and hard-to-break').

The distal end of the flexible printed board, being a good distance from the bent portion of the flexible printed board, is relatively lower in elastic restoring force (i.e., 'inelastic').

The sheet-like portion of the protective member is interposed between neighborhood of the distal end i.e. an inelastic portion of the flexible printed board and the front frame body. Therefore, drop-off of the protective member from the back frame body upon reception of the elastic restoring force of the flexible printed board is suppressed.

According to one embodiment, since the electronic component mounted on the flexible printed board and the back frame body are separate from each other, damage to the flexible printed board or the electronic component due to contact between the flexible printed board or the electronic component and the back frame body is suppressed.

With the display device according to one aspect of the invention, the flexible printed board is bent so as to be farther from the front frame body, by which the flexible printed board is protected totally in the peripheral edge direction. Therefore, contact of the flexible printed board and the front frame body with each other can be suppressed with regard to both end portions in the peripheral edge direction as well as the central portion in the peripheral edge direction. As a result, displacement or twist or the like of the flexible printed board that has come into contact with the front frame body can be suppressed.

Consequently, damage to the flexible printed board due to contact of the flexible printed board and the front frame body with each other can be suppressed.

DETAILED DESCRIPTION OF PREFERRED EMBODIMENTS

Hereinbelow, embodiments of the present invention will be described in detail based on the accompanying drawings showing embodiments thereof. In the following description, up/down, front/rear and left/right directions indicated by arrow signs in the drawings are used.

Embodiment 1

Figure 1:
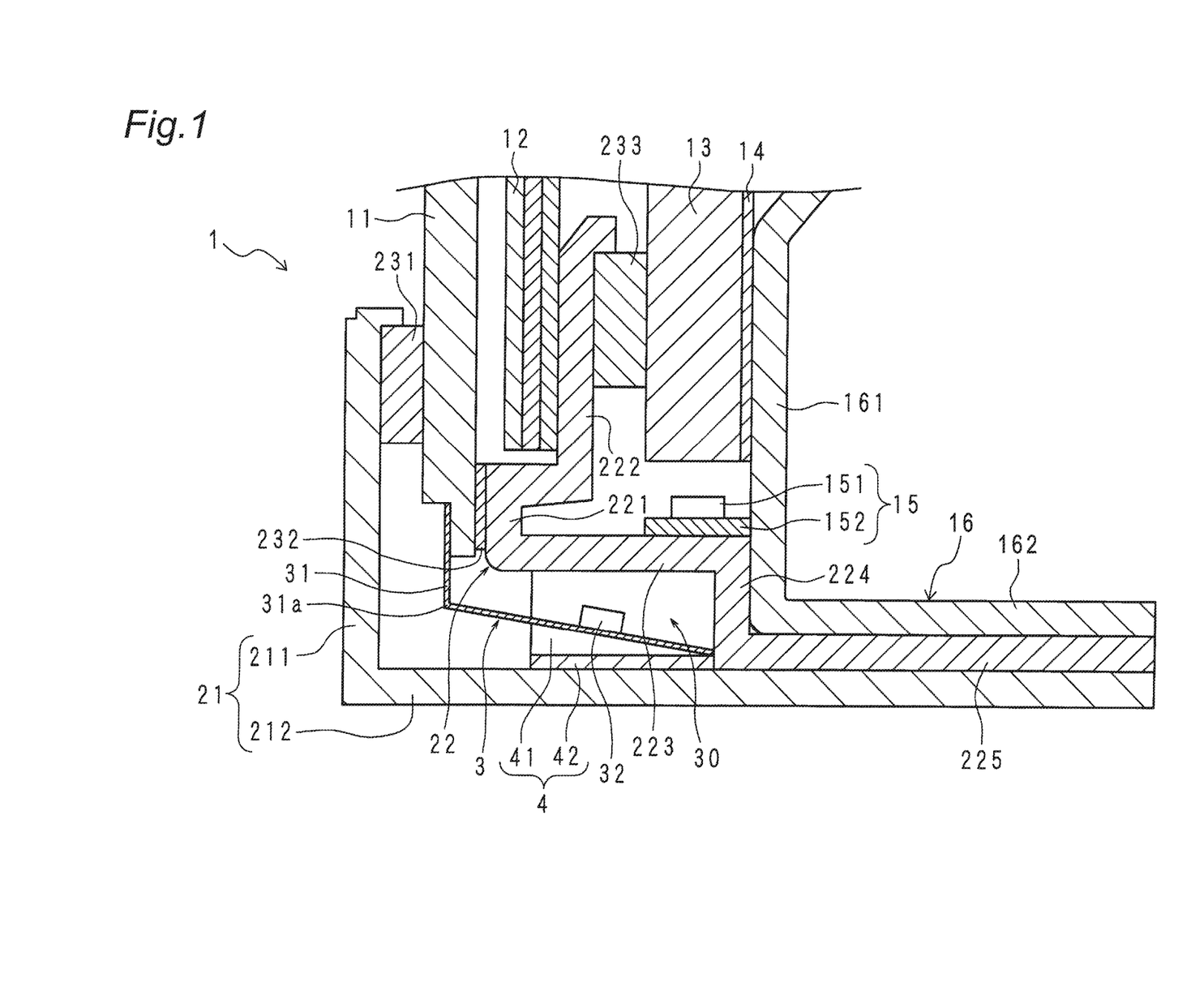
FIG. 1 is a sectional view schematically showing a configuration of a display device according to Embodiment 1.
Figure 2:
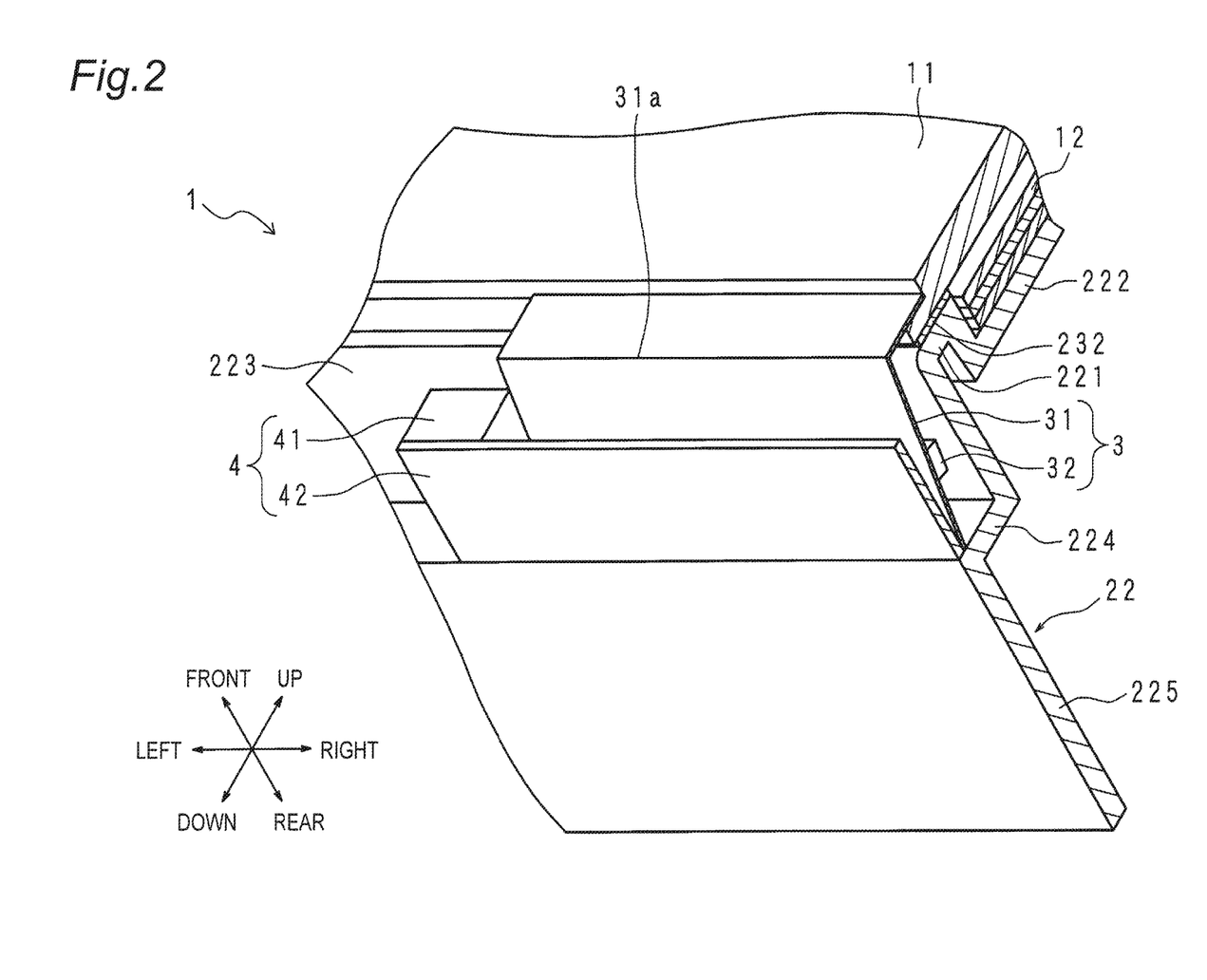
FIG. 2 is perspective view schematically showing the configuration of the display device.

FIGS. 1 and 2 are a sectional view and perspective view, respectively, schematically showing the configuration of a display apparatus 1 according to Embodiment 1. Up/down and left/right directions as viewed toward FIG. 1 are up/down and front/rear directions, respectively, of the display apparatus 1. Cross sections of individual parts are shown on the right side in FIG. 2.

Figure 3:
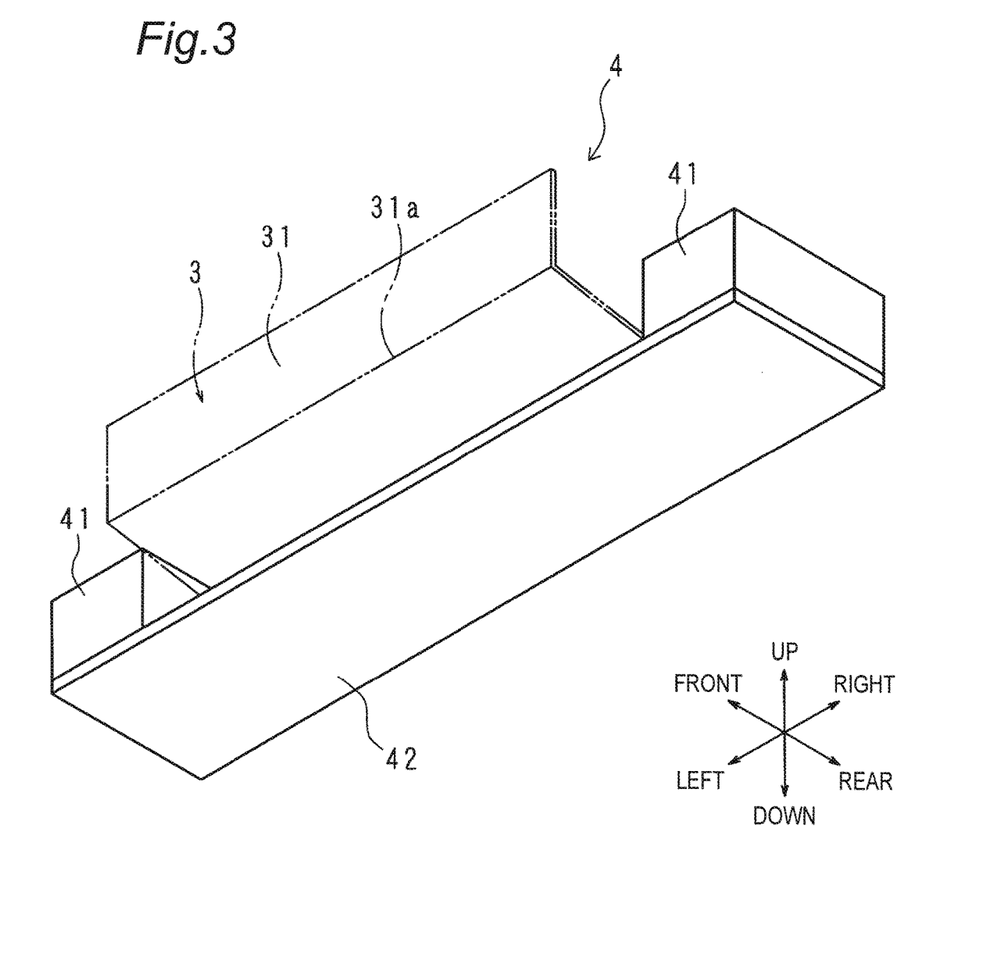
FIG. 3 is a perspective view schematically showing a configuration of a protective member included in the display device.

FIG. 3 is a perspective view schematically showing a configuration of a protective member 4 included in the display apparatus 1.

The display apparatus 1 is formed into a rectangular shape. FIGS. 1 and 2 show lower-side part of the display device 1.

The display apparatus 1 includes a display panel 11, an optical sheet group 12, a light guide plate 13, a reflecting sheet 14, a light source 15, a BL chassis 16, bezel 21 (front frame body), a P-chassis 22 (back frame body), individually rectangular frame-shaped cushioning members 231, 232, 233, a plurality of circuit boards 3, 3, . . . , and a plurality of protective members 4, 4, . . . .

In FIG. 2, component members other than the display panel 11, the optical sheet group 12, the P-chassis 22, the cushioning member 232, the circuit board 3 and the protective member 4 are not shown. In FIG. 3, the circuit board 3 is depicted by two-dot chain line.

Each circuit board 3 includes a flexible printed board 31 and a drive circuit 32 (electronic component).

Each protective member 4 includes two protruding portions 41, 41 and a sheet-like portion 42.

The display panel 11 is made by using an LCD panel. The display panel 11 is formed into a rectangular flat-plate shape extending in up/down and front/rear directions. The display panel 11 has a rectangular-shaped display area, and a rectangular frame-shaped casing area surrounding the display area. The display panel 11 includes a front-side glass substrate and a back-side glass substrate. Liquid crystals are sealed between the two glass substrates. As the liquid crystals contained in the display panel 11 are driven, an image is displayed on the display panel 11.

The optical sheet group 12 is formed into a rectangular-shaped stacked body in which a plurality of rectangular-shaped optical sheets are stacked together. The optical sheet group 12 is placed so as to face a back surface of the display panel 11, covering at least the display area of the display panel 11 from its back. Each of the optical sheets forming the optical sheet group 12 has light diffusion function or light convergence function or the like.

The light guide plate 13 is formed into a rectangular plate shape. The light guide plate 13 is placed so as to face a back surface of the optical sheet group 12.

Light incident on inside of the light guide plate 13 goes out from a front surface of the light guide plate 13. For this reason, a plurality of reflecting portions, light guide plate 13. Light incident on the reflecting portions is reflected toward front thereof.

The reflecting sheet 14 is formed into a rectangular shape. The reflecting sheet 14 is in close contact with the back surface of the light guide plate 13 so as to cover the back surface entirely.

The light source 15 includes a plurality of LEDs 151, 151, . . . and an LED board 152.

The LEDs 151, 151, are mounted equidistantly in one line along the left/right direction on one surface of the LED board 152.

The LED board 152 is formed into a rectangular flat-plate shape elongated in the left/right direction. The surface of the LED board 152 on which the LEDs 151, 151, . . . are mounted is placed so as to face a lower end face of the light guide plate 13. In this case, the LEDs 151 and the light guide plate 13 are placed separate from each other.

Light emitted from the light source 15 becomes incident on inside of the light guide plate 13 through the lower end face of the light guide plate 13, going out through the front surface of the light guide plate 13. The light emitted from the light source 15, unless transmitted by the light guide plate 13, never becomes incident on the display panel 11 or the optical sheet group 12.

In addition, the display device 1 may include a plurality of light sources 15, 15, . . . . The light sources 15 may also be placed in opposition to an end face of the light guide plate 13 other than its lower end face.

The BL chassis 16 is a backlight chassis. The BL chassis 16 includes a supporting portion 161 and a fitting portion 162.

The supporting portion 161 is formed into a rectangular plate shape and placed so as to face a back surface of the reflecting sheet 14.

The fitting portion 162 is protruded rearward from a peripheral edge portion of the supporting portion 161.

The bezel 21 is to support the peripheral edge portion of the display panel 11 from front thereof.

The bezel 21 includes a panel supporting portion 211 and a fitting portion 212.

The panel supporting portion 211 is formed into a rectangular frame shape. An inner peripheral portion of the panel supporting portion 211 is placed in opposition to a peripheral edge portion of a front surface of the display panel 11.

The fitting portion 212 is formed into a rectangular cylindrical shape whose axial direction is along the front/rear direction. The fitting portion 212 is protruded rearward from an outer peripheral portion of the panel supporting portion 211.

The P-chassis 22 is a panel chassis. The P-chassis 22 includes a first supporting portion 221, a second supporting portion 222, a third supporting portion 223, a coupling portion 224, and a fitting portion 225.

The first supporting portion 221 is formed into a rectangular frame shape. The first supporting portion 221 is placed in opposition to a peripheral edge portion of a back surface of the display panel 11.

The panel supporting portion 211 of the bezel 21 and the first supporting portion 221 of the P-chassis 22 hold the display panel 11 by clamping the display panel 11 from front and back at the peripheral edge portion of the display panel 11 with the cushioning members 231, 232 interposed therebetween.

The second supporting portion 222 is formed into a rectangular frame shape. The second supporting portion 222 is connected to an inner peripheral portion of the first supporting portion 221, and is placed rearward of the first supporting portion 221. The second supporting portion 222 is placed in opposition to a peripheral edge portion of a back surface of the optical sheet group 12 and a peripheral edge portion of a back surface of the light guide plate 13.

An edge of an upper portion of the optical sheet group 12 is attached to an upper frame portion of the second supporting portion 222.

The second supporting portion 222 of the P-chassis 22 and the supporting portion 161 of the BA chassis hold a set of the light guide plate 13 and the reflecting sheet 14 by clamping the set from front and back at a peripheral edge portions of the set with the cushioning member 233 interposed therebetween.

The third supporting portion 223 is formed into a rectangular cylindrical shape whose axial direction is along the front/rear direction. The third supporting portion 223 is protruded rearward from an outer peripheral portion of the first supporting portion 221.

The light source 15 is mounted on an inner surface of the third supporting portion 223 via an unshown heat sink. An outer surface of the third supporting portion 223 faces an inner surface of the fitting portion 212 of the bezel 21.

The coupling portion 224 is formed into a rectangular frame shape. The coupling portion 224 is protruded from a rear end portion of the third supporting portion 223 outward of the third supporting portion 223. The coupling portion 224 is placed in opposition to a back surface of the panel supporting portion 211 of the bezel 21. The coupling portion 224 couples the third supporting portion 223 and the fitting portion 225 to each other.

A space surrounded by the third supporting portion 223, the coupling portion 224 and the fitting portion 212 of the bezel 21 is a placement space 30 in which circuit boards 3 are to be placed.

The fitting portion 225 is protruded rearward from a distal end portion of the coupling portion 224.

The bezel 21, the P-chassis 22, and the fitting portions 212, 225, 162 of the BL chassis 16 are removably attached to one another.

The circuit boards 3 are provided by using COF (Chip On Film) or TCP (Tape Carrier Package) or the like. The circuit boards 3, 3, . . . are arrayed along a peripheral edge direction of the display panel 11 (hereinafter, referred to simply as peripheral edge direction) in peripheries of the display panel 11. The peripheral edge direction shown in FIGS. 1 to 3 is the left/right direction.

Each flexible printed board 31 is made by using a sheet material made of, e.g., 0.05 mm thick polyethylene terephthalate resin. The flexible printed board 31 is protruded from a peripheral-edge end portion of the display panel 11. Interconnecting lines formed on the flexible printed board 31 are electrically connected to the display panel 11.

The flexible printed board 31 is bent toward the P-chassis 22. In more detail, the flexible printed board 31 has a bent portion 31a between a base end portion and a distal end portion thereof (upper side in the figure). A portion of the flexible printed board 31 ranging from the bent portion 31a toward the base end portion is protruded along the display panel 11. A portion of the flexible printed board 31 ranging from the bent portion 31a toward the distal end of the flexible printed board 31 (lower part in the figure) is placed in the placement space 30.

In one surface of the flexible printed board 31 (more specifically, on a surface of the flexible printed board 31 opposed to the P-chassis 22), a drive circuit 32 is mounted. The drive circuit 32 is to drive liquid crystals contained in the display panel 11. The drive circuit 32 is placed in the placement space 30 so as to be opposed to the P-chassis 22. The drive circuit 32 is kept separate from the P-chassis 22 to such an extent that the drive circuit 32 can hardly contact the P-chassis 22 even when the circuit board 3 is vibrated, as an example.

The protective members 4, 4, . . . are provided in one-to-one correspondence to the circuit boards 3, 3, . . . .

The protruding portions 41, 41 of the individual protective members 4 are attached each to the P-chassis 22. In more detail, each protruding portion 41 is bonded to an outer surface of the third supporting portion 223. The protruding portion 41, being made from plastic foam such as urethane foam, has cushioning property.

The protruding portion 41 is formed into a quadrangular-prism shape having both end faces each of which measures at least 4 mm×3 mm, preferably 5 mm×5 mm or more. One end face of the both end faces of the protruding portion 41 is bonded to the outer surface of the third supporting portion 223. The other end face of the both end faces of the protruding portion 41 is bonded to one surface of the sheet-like portion 42. That is, the protruding portion 41 is protruded from the one surface of the sheet-like portion 42 toward the P-chassis 22. A protruding length of the protruding portion 41 from the sheet-like portion 42 is equal to an axial length (e.g., 1.0 mm) of the protruding portion 41.

The protruding portion 41, whose both end faces each have an area of 4 mm×3 mm or more, is prevented from separating from the sheet-like portion 42 of the protruding portion 41 or from the P-chassis 22 due to peeling of the bonding surface. Given that both end faces each have an area of less than 4 mm×3 mm, the protruding portion 41 becomes more likely to be separated from the sheet-like portion 42 or the P-chassis 22.

The area of each end face of the protruding portion 41 is preferably set as large as possible in terms of improving the bonding strength. However, the more the area of each end face of the protruding portion 41 is increased, the more the size of the protruding portion 41 is increased so as to obstruct downsizing of the display apparatus 1. Therefore, the area is preferably set to 5 mm×5 mm or so.

The protruding portions 41, 41 are arrayed in the placement space 30 so as to be separate from one another by proper distance along the peripheral edge direction. The circuit boards 3 are placed between the protruding portions 41, 41, respectively.

The sheet-like portion 42 is made by using a sheet material made of, e.g., 0.5 mm thick polycarbonate resin. The sheet-like portion 42 has insulating property and further has more flexibility than the protruding portions 41. The thickness of the sheet-like portion 42 is smaller than the protruding length of each protruding portion 41.

The sheet-like portion 42 is formed into a rectangular shape elongated in the peripheral edge direction. The protruding portions 41, 41 are bonded respectively to both end portions, in the peripheral edge direction, of one surface of the sheet-like portion 42.

The sheet-like portion 42 is placed in the placement space 30. One surface of two surfaces of the sheet-like portion 42 (the surface from which the protruding portions 41, 41 are protruded) faces the outer surface of the third supporting portion 223. The other surface of the two surfaces of the sheet-like portion 42 faces the inner surface of the fitting portion 212.

The sheet-like portion 42 is interposed between the bezel 21 and the flexible printed board 31 to protect the flexible printed board 31. In this case, as viewed from the bezel 21, the sheet-like portion 42 covers the flexible printed board 31 over a range from one end of two ends to the other end of the two ends thereof in the peripheral edge direction (i.e., from left to right in the figure). The sheet-like portion 42 is also interposed between the bezel 21 and the portion of the flexible printed board 31 ranging from the bent portion 31a toward the distal end portion.

Here is discussed a case in which the display device 1 includes no protective members 4.

During assembling or disassembling process of the display device 1, the bezel 21 is removed from or attached to the P-chassis 22 on which the display panel 11 is provided.

The flexible printed board 31, which is bent toward the P-chassis 22, is biased in such a direction that the bent portion 31a is stretched by elasticity of the flexible printed board 31 (i.e., a direction in which the distal end portion of the flexible printed board 31 approaches the fitting portion 212 of the bezel 21). Accordingly, it is highly likely that the flexible printed board 31 may be put into contact with the bezel 21 that is removed or attached.

When the bezel 21 has come into contact with the circuit board 3, the flexible printed board 31 is displaced or twisted or otherwise. With a slight displacement or twist or the like, the flexible printed board 31 recovers by its elasticity, involving no significant problems. However, with an excessive displacement or twist or the like, the flexible printed board 31 may be damaged.

In the case where the flexible printed board 31 is not bent, the flexible printed board 31 can be prevented from approaching the bezel 21. However, keeping the flexible printed board 31 in a flat state would cause the display device 1 to be unnecessarily upsized in the direction in which the flexible printed board 31 is protruded from the display panel 11.

In terms of solving such problems, it is conceivable to use, instead of the flexible printed board 31, a flexible printed board which includes a board body, and an extended portion extended from the board body, and to make the extended portion bonded to the P-chassis 22. However, because such a flexible printed board is larger in size than the flexible printed board 31, manufacturing cost of the display device 1 may be increased. Also, a border portion between the board body and the extended portion may be bent, causing an elastic restoring force such that the extended portion may be biased in a direction of separation from the P-chassis 22 so as to be peeled.

Next, functions and effects of the protective members 4 will be described.

Although the flexible printed board 31 is biased in such a direction as to approach the fitting portion 212 of the bezel 21, there is no fear that the bezel 21 and the flexible printed board 31 may contact each other. This is because the sheet-like portion 42 is interposed between the bezel 21 and the flexible printed board 31 (more specifically, between the fitting portion 212 and the portion of the flexible printed board 31 ranging from the bent portion 31a to the distal end portion).

Even when the flexible printed board 31 is biased toward elongation, the sheet-like portion 42 makes contact with the flexible printed board 31 to hinder the elongation. Thus, the flexible printed board 31 is maintained in a state of being bent toward the P-chassis 22.

Still more, the sheet-like portion 42 covers not only the peripheral-edge-direction end portions flexible printed board 31 but also the peripheral-edge-direction central portion of the flexible printed board 31. Therefore, contact of the bezel 21 and the flexible printed board 31 with each other can be suppressed more securely than in the case where only the end portions of the flexible printed board 31 are covered with small rubber pieces as it s been conventionally.

The sheet-like portion 42 flexible. Therefore, the sheet-like portion 42, even when making contact with the flexible printed board 31, never damages the flexible printed board 31.

The protruding portions 41, 41 are rigid. Therefore, the protruding portions 41, 41 serve as a base for securely supporting the easily deformable sheet-like portion 42.

Nevertheless, the rigidness of the protruding portion 41 is only more rigid than the sheet-like portion 42. When the flexible printed board 31 is displaced in the peripheral edge direction, the flexible printed board 31 may make contact with the protruding portion 41, but there is no possibility that the flexible printed board 31 is damaged by the contact between the protruding portions 41 and the flexible printed board 31. This is because protruding portions 41 have cushioning property.

The drive circuit 32 is separate from the P-chassis 22. That is, even though the protective members 4 are interposed between the bezel 21 and the flexible printed board 31, there is no possibility that the circuit board 3 unnecessarily approaches the P-chassis 22. Therefore, damage to the circuit board 3 due to contact between the circuit board 3 and the P-chassis 22 is suppressed.

A portion of the flexible printed board 31 covered by the sheet-like portion 42 is a portion distant from the bent portion 31a, i.e., a portion where the flexible printed board 31 has low elastic restoring force attributable to the bending of the flexible printed board 31. Therefore, as compared with cases where the sheet-like portion 42 covers a portion of the sheet-like portion 42 close to the bent portion 31a, i.e., a portion where the flexible printed board 31 has high elastic restoring force attributable to the bending of the flexible printed board 31, the protective members 4 in contact with the flexible printed board 31 receive smaller external force from the flexible printed board 31. As a result of this, unnecessary drop-off of the protective members 4 due to reception of external force from the flexible printed board 31 can be suppressed.

In the display apparatus 1 of this embodiment, a portion of the flexible printed board close to its distal end is protected by the protective members 4, and a portion of the flexible printed board 31 close to its base end is not protected. However, since the flexible printed board 31 is maintained bent toward the P-chassis 22 by the protective members 4, there is no possibility that the portion close to the base end of the flexible printed board may contact the bezel 21. As a consequence, the flexible printed board 31 is protected totally from its distal end to its base end.

Moreover, the display apparatus 1 may include, instead of the protective member 4, a protective member having only a sheet-like portion corresponding to the sheet-like portion 42. In this case, both end portions of the protective member in the peripheral edge direction are directly attached to the P-chassis 22. In addition, the protective member is curved along the peripheral edge direction in terms of the necessity for making the drive circuit 32 and the P-chassis 22 separate from each other. Accordingly, there is a need for improving the fixing strength of the protective member to the P-chassis 22 (e.g., by fixing with screws) so that the protective member is prevented from dropping off from the P-chassis 22 due to elastic restoring force generated in the protective member.

Meanwhile, the case of the protective member 4, the protruding portions 41, 41 interposed between the P-chassis 22 and the sheet-like portion 42 serve as spacers, allowing the sheet-like portion 42 to be maintained in a flat state. Therefore, peeling of the protective member 4 from the P-chassis 22 due to generation of unnecessary elastic restoring force the sheet-like portion 42 is suppressed.

Furthermore, the interposition of the protruding portions 41, 41 between the sheet-like portion 42 and the P-chassis 22 makes it possible to properly set the distance between the sheet-like portion 42 and the third supporting portion 223. An excessively far distance from the sheet-like portion 42 to the third supporting port on 223 would obstruct downsizing of the display device 1. On the other hand, an excessive closeness of the sheet-like portion 42 to the third supporting portion 223 would cause the sheet-like portion 42 to press the flexible printed board 31 against the P-chassis 22. This leads to a fear that the flexible printed board 31 or the drive circuit 32 may contact the P-chassis 22 so as to damage the circuit board 3.

The display apparatus 1 may also include, instead of the protective member 4, a protective member having a sheet-like portion and a protruding portion provided integrally with the sheet-like portion. Such a protective member may be formed by integral molding or formed from a strip-like member. In the latter case, the protruding portions are vertically raised pieces formed by, for example, bending longitudinal both end portions of the strip-like member each into an L shape. In the case of a protective member in which the sheet-like portion and the protruding portions are integrated together, it is desirable to enhance the rigidity of the protruding portions higher than the sheet-like portion by, for example, devising the shape of the protruding portions (e.g., by providing ribs).

Meanwhile, in the case of the protective member 4, the sheet-like portion 42 and the protruding portions 41 are independent members. Therefore, the sheet-like portion may be formed from a flexible member while the protruding portions 41 may be formed from a rigid member. Thus, the protruding portions 41 may be of a simple shape.

Embodiment 2

Figure 4:
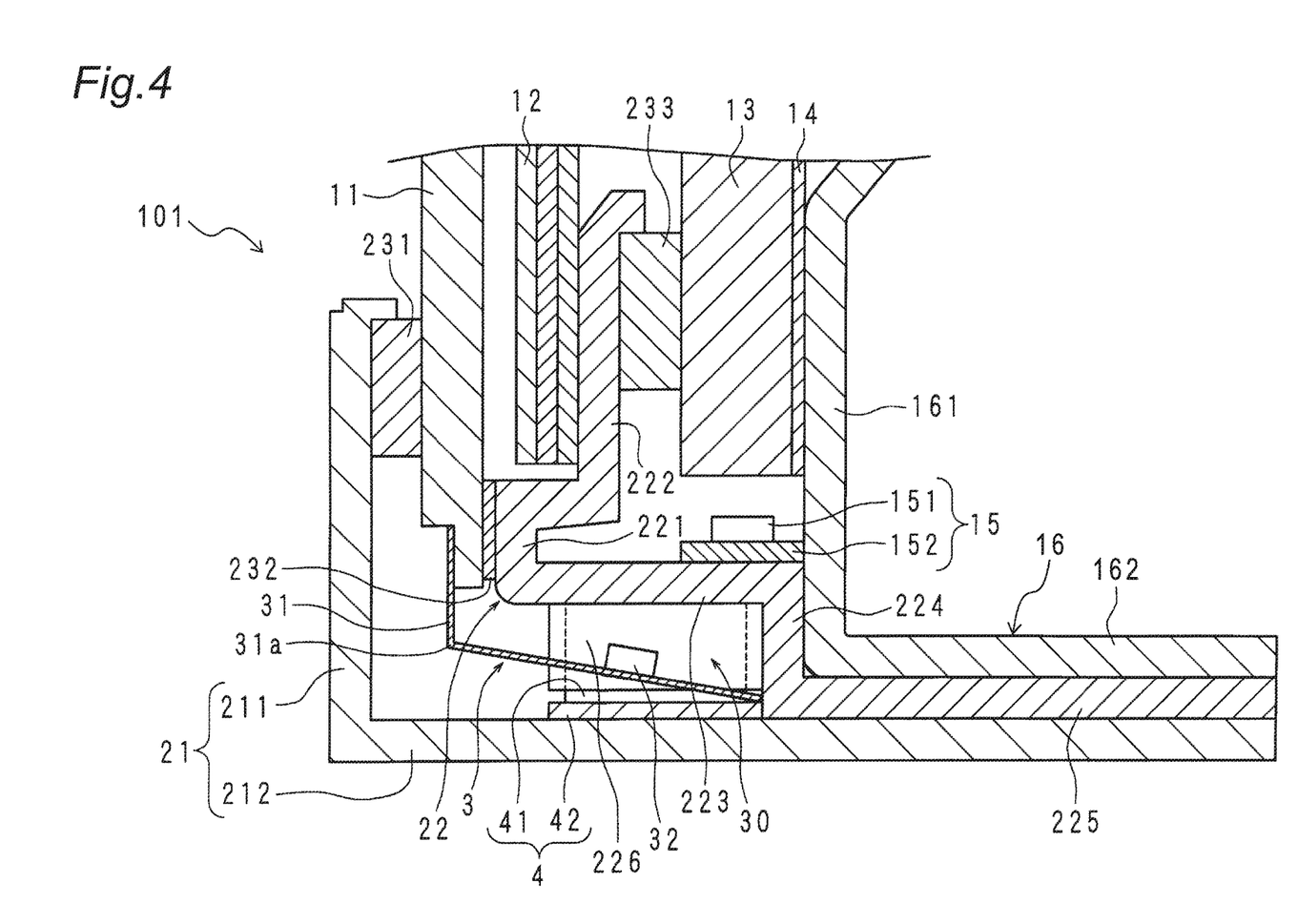
FIG. 4 is a sectional view schematically showing a configuration of a display device according to Embodiment 2.
Figure 5:
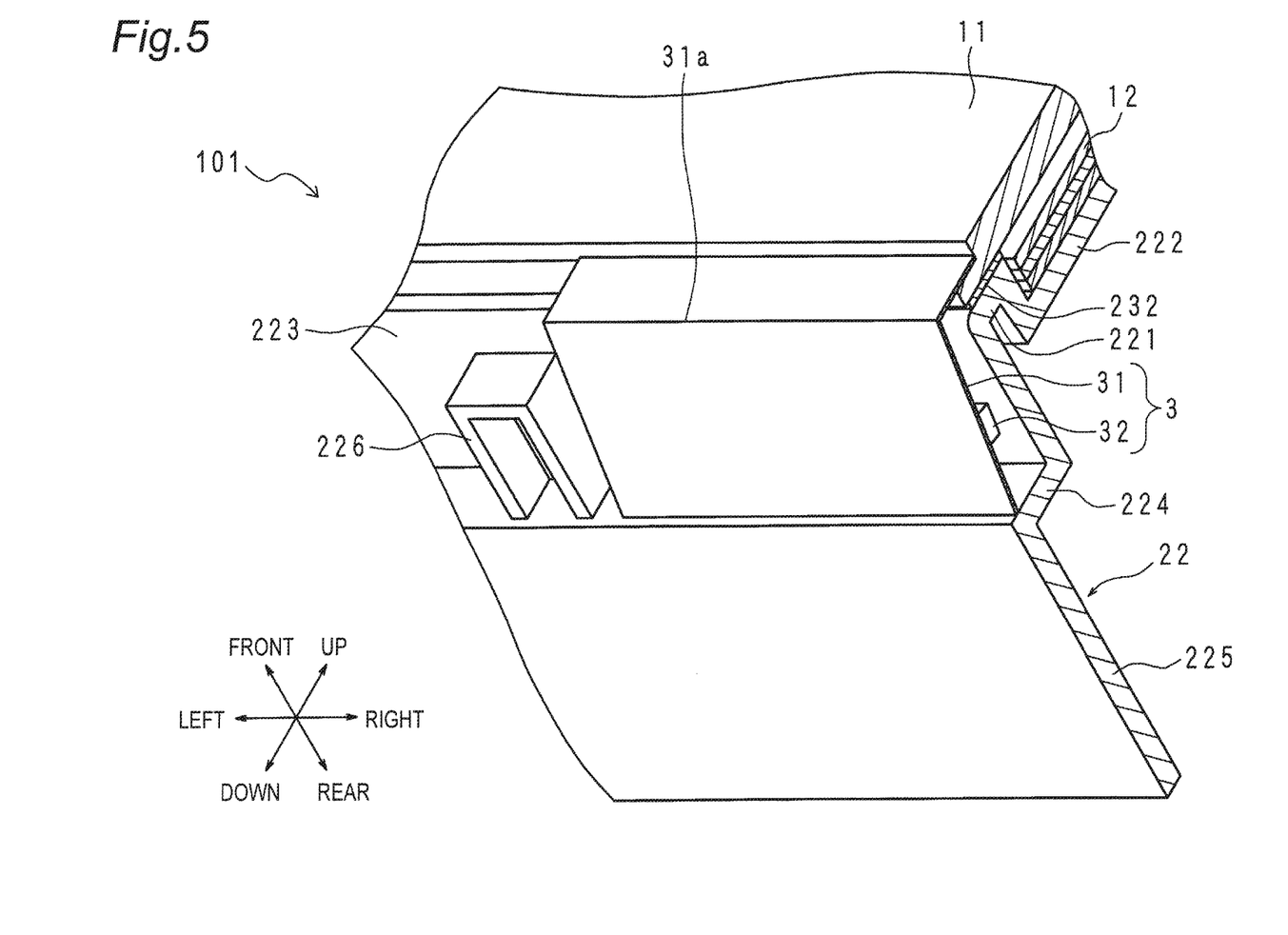
FIG. 5 is a perspective view schematically showing the configuration of the display device.

FIGS. 4 and 5 are a sectional view and a perspective view, respectively, showing a configuration of structure of a display apparatus 101 according to Embodiment 2. FIGS. 4 and 5 correspond to FIGS. 1 and 2, respectively. In FIG. 5, the protective members 4 are not shown.

The display apparatus 101 of this embodiment is generally similar in configuration to the display apparatus 1 of Embodiment 1. Its differences from Embodiment 2 will be described below, where component members corresponding to those of Embodiment 1 are designated by like reference signs, with their description omitted.

Fit-in portions 226, 226, . . . are provided at position close to the third supporting portion 223 of the P-chassis 22.

Each fit-in portion 226 is a recessed portion surrounded by the coupling portion 224 and three rib-like portions provided on the outer surface of the third supporting portion 223 so as to protrude from the outer surface of the third supporting portion 223. The rib-like portions are configured into a U-like shape, where combination of the rib-like portions and the coupling portion 224 forms a rectangular-shaped recessed portion. Shape and inner dimensions of the recessed portion correspond to shape and outer dimensions of the protruding portion 41, respectively.

The protruding portions 41 of the protective member 4 are to be fitted into the individual fit-in portions 226, respectively.

Fitting the protruding portions 41 into the fit-in portions 226 allows the protruding portions 41 to be easily positioned into their fixing positions relative to the P-chassis 22.

Each protruding portion 41 is fixed to the P-chassis 22 by frictional force between the outer surface of the protruding portion 41 and the inner surface of the fit-in portion 226.

The display device 101 as described above is enabled to produce functions and effects similar to those of the display device 1 of Embodiment 1.

In addition, an adhesive agent may be provided interveniently between the outer surface of the protruding portion 41 and the inner surface of the fit-in portion 226. The protruding portion 41 may also be fitted in the fit-in portion 226 by forced-fit. In this case, the protruding portions 41 are fixed to the P-chassis 22 by both the above-mentioned frictional force and elastic restoring force of the protruding portions 41.

The embodiments disclosed herein should be construed as not being limitative but being an exemplification at all points. The scope of the invention is not defined by senses as described hereinabove but intended to include all chances and modifications in senses and scope as defined in the appended claims.

Further, the display devices 1 and 101 may include constituent elements that are not disclosed in Embodiment 1 or 2 as far as the effects of the invention are maintained.

The invention claimed is:

1. A display apparatus comprising:
    a display panel;
    a front frame body which supports a peripheral edge portion of the display panel from a front of the display panel;
    a back frame body which supports the peripheral edge portion of the display panel from a back of the display panel;
    a flexible printed board protruded from the peripheral edge portion of the display panel and bent toward the back frame body at a bent portion of the flexible printed board; and
    a protective member attached to the back frame body, wherein
    the protective member includes:
        a sheet portion interposed between the front frame body and the flexible printed board; and
        two protruding portions attached to the back frame body, side by side along a peripheral edge direction of the display panel and protruded from one surface of the sheet portion,
    the flexible printed board is between the two protruding portions,
    a distal end of the flexible printed board is in contact with the sheet portion,
    the sheet portion is spaced apart from the flexible printed board at all portions except for the distal end,
    each of the front frame body and the back frame body is a seamless body,
    a first fitting portion that is a portion of the front frame body and a second fitting portion that is a portion of the back frame body are attached to each other,
    a portion of the first fitting portion is opposed to an opposing portion of the back frame body,
    a portion of the flexible printed board is located between the portion of the first fitting portion and the opposing portion of the back frame body, and
    the portion of the flexible printed board is surrounded by the opposing portion of the back frame body, the sheet portion, and the two protruding portions.

2. The display apparatus according to claim 1, wherein the two protruding portions are bonded to the back frame body, and
    a bonding region of each of the two protruding portions to the back frame body has an area of at least 4 mm×3 mm.

3. The display apparatus according to claim 1, wherein the sheet portion is more flexible than the two protruding portions, and
    a protruding length of each of the two protruding portions is larger than a thickness of the sheet portion.

4. The display apparatus according to claim 1, wherein a fit-in portion into which each of the two protruding portions is to be fitted is provided in the back frame body.

5. The display apparatus according to claim 1, wherein the sheet portion of the protective member is interposed between the front frame body and, a portion between the bent portion and the distal end of the flexible printed board.

6. The display apparatus according to claim 1, wherein an electronic component is mounted on a surface of the flexible printed board facing the back frame body, and
    the electronic component and the back frame body are separate from each other.

* * * * *